(No Model.)
W. C. MAVOR.
TRUCK.
No. 294,142.  Patented Feb. 26, 1884.
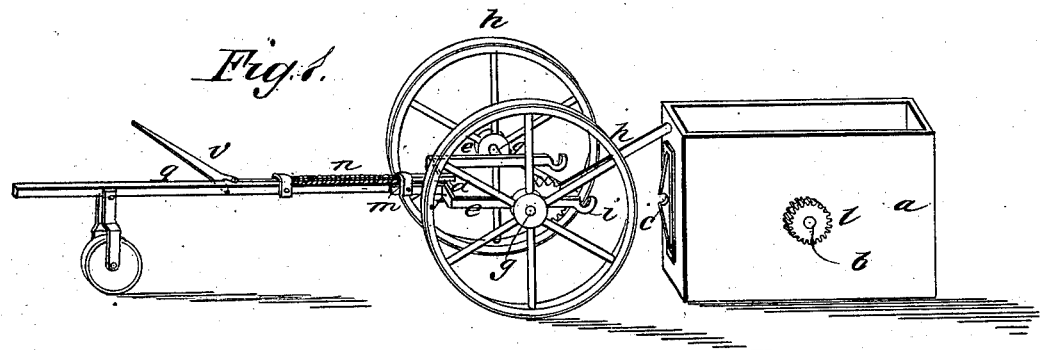
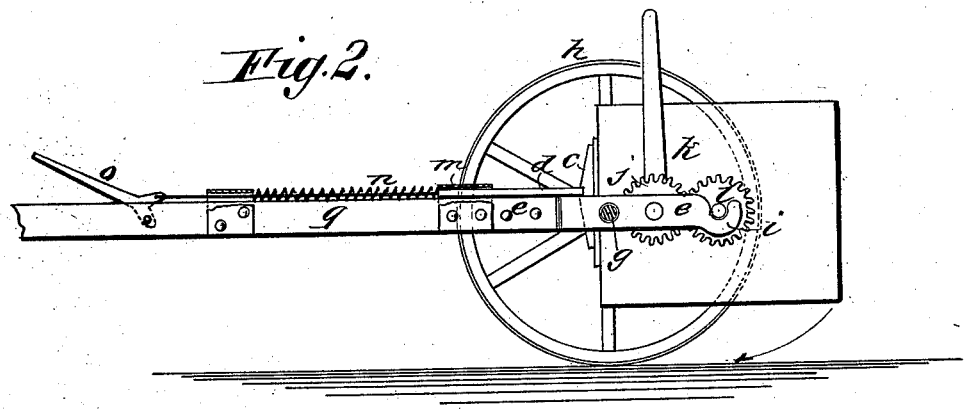
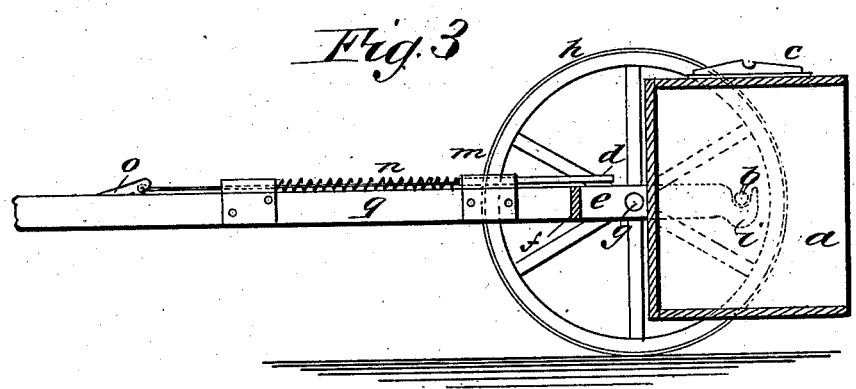
WITNESSES:
INVENTOR:
BY
ATTORNEYS.

UNITED STATES PATENT OFFICE.

WARWICK C. MAVOR, OF FORLORN HOPE, LOUISIANA.

TRUCK.

SPECIFICATION forming part of Letters Patent No. 294,142, dated February 26, 1884.

Application filed July 7, 1883. (No model.)

*To all whom it may concern:*

Be it known that I, WARWICK C. MAVOR, of Forlorn Hope, Iberville parish, Louisiana, have invented a new and Improved Dumping-Truck, of which the following is a full, clear, and exact description.

The object of my invention is more particularly to provide a simple and efficient means for handling the sugar-wagons of sugar-refineries; but it is also designed for other uses.

My invention consists in the peculiar construction and arrangement of the parts, as hereinafter more fully set forth, and pointed out in the claims.

Reference is to be had to the accompanying drawings, forming part of this specification, in which similar letters of reference indicate corresponding parts in all the figures.

Figure 1 is a side elevation of the truck and the box, the box being detached and resting on the floor as when left or to be taken up by the truck. Fig. 2 is a side elevation of the truck with the box loaded on, one wheel being removed; and Fig. 3 is a longitudinal sectional elevation of the truck and the box, the box being turned over on its trunnions for dumping it.

The box $a$, which is preferably of rectangular form and has a flat bottom, is provided with trunnions $b$ at or about the center of its sides, and it has a notched cleat, $c$, attached to the front end, for a catch to be fastened by the sliding latch-bolt $d$, also a toothed wheel, $l$, attached to one of its trunnions. The truck-frame is a yoked or forked device, consisting of two side bars, $e$, connected at the front side of the axle to the cross-bar $f$, said side having the short axles $g$ for the wheels $h$, attached to them, and they project back nearly half the length of the box $a$, and terminate in hooked bearings $i$, adapted to lift up and hold the box as shown.

On one of the side bars, $e$, there is a toothed wheel, $j$, pivoted so as to gear with the wheel $l$ of the box when the box is resting in the bearings $i$. Said wheel $j$ has a lever, $k$, by which to operate it for turning the box $a$ on its trunnions to dump and to readjust it. The latch-bolt $d$ is arranged to slide in a case, $m$, on the tongue $q$ of the truck, and has a spring, $n$, to cause it to lock self-actingly with the notched cleat $c$ when the box swings into position, and a lever, $o$, to detach it when the box is required to dump.

In the common method of using the sugar-wagons the boxes $a$ have three small rollers attached to the bottom, by which to roll the boxes along the floor; but they have to be lifted up when they are to be emptied, which requires the service of three or more men, as the boxes weigh, when loaded, about nine hundred pounds; but with this improved truck one man can load the filled box on his truck, roll it to the place for dumping, and dump it with less labor than when assisting in the old process.

I do not abandon or dedicate to the public any patentable features set forth herein and not hereinafter claimed, but reserve the right to claim the same either in a reissue of any patent that may be granted upon this application or in other applications for Letters Patent that I may make.

Having thus described my invention, I claim as new and desire to secure by Letters Patent—

1. The combination of a box, $a$, having trunnions $b$, and a toothed wheel, $l$, on one of said trunnions, with the truck having hooked bearing rear extensions, $i$, of the frame, and the toothed wheel $j$ and lever $k$, said frames being open at the rear end to receive the box between the sides, substantially as described.

2. The combination of a box, $a$, having trunnions $b$ and the notched cleat $c$, with the truck having hooked bearing-extensions $i$ of the frame, and the sliding latch-bolt $d$, the said frame being open at the rear end to receive the box between the sides, and the latch-bolt having a spring and a lever for actuating it, substantially as described.

WARWICK C. MAVOR.

Witnesses:
JOHN F. DUPUY,
I. W. NICOL.